3,686,079
METHOD OF FORMING A FILM BY ELECTROLYTIC POLYMERIZATION
Kunihiko Masunaga and Hiroshi Shinohara, Toyota-shi, Aichi-ken, Japan, assignors to Toyota Jidosha Kogyo Kabushiki Kaisha, Toyota-shi, Japan
Filed Aug. 9, 1971, Ser. No. 170,212
Claims priority, application Japan, Aug. 17, 1970, 45/71,603
Int. Cl. C23b 5/00, 9/00; B01k 5/00
U.S. Cl. 204—14 N                                6 Claims

ABSTRACT OF THE DISCLOSURE

Method of forming a film of methacrylonitrile alone or a copolymer film of methacrylonitrile and another vinyl polymer on an object surface through electrolytic polymerization with the object taken as one of the electrodes.

BACKGROUND OF THE INVENTION

The present invention relates to a method of forming a film on an object by electrolytic polymerization.

Recent advances have been made in forming a film of pigment or polymer on a metal electrode surface through electrophoretic deposition. The method is widely used for industrial purposes. According to this method, however, a water-soluble prepolymer is separately synthesized, and it is dissolved in a water-pigment system. The prepolymer and the pigment are migrated through an electric field and deposited. Thus, in this method the starting material must be a prepolymer which requires curing thereby making the method costly. Also, the use of various additives complicates the control of the bath, the coulomb efficiency is low, and a thin film is difficult to obtain.

Recently it was reported that by utilizing electrolytic polymerization, the metal surface could be treated with both polymerization and film formation being simultaneously effected starting from a monomer. Meanwhile, Asahara et al. succeeded in depositing a polymer film directly on the electrode plate, using a vinyl monomer like acrylonitrile ("Kinzoku Hyomen Gijutsu," vol. 20, No. 8 P 414, 1969). As Asahara et al., themselves admit, however, the film thus obtained has a low molecular weight and lacks sufficient adhesion, hardness and flexibility. It therefore is unfit for practical purposes. Moreover, a cross-linked polymer film cannot be produced by the existing technique.

SUMMARY OF THE INVENTION

The present invention relates to a method of forming a film of methacrylonitrile alone or a copolymer film of methacrylonitrile and another vinyl polymer on an object surface through electrolytic polymerization with the object to be coated taken as one of the electrodes.

The primary object of the present invention is to provide a method of forming a uniform film on the surface of an object having an intricate configuration.

Another object of the present invention is to provide a method of forming a uniform film on the surface of an object having an intricate configuration.

According to the present invention, a mixture is used comprising methacrylonitrile alone or methacrylonitrile and a vinyl monomer, and a polar organic solvent containing a supporting electrolyte for enhancing electroconductivity. Direct current is passed through the mixture, and the object to be coated is positioned as one of the electrodes. A film of methacrylonitrile is formed on the surface of the object.

BRIEF DESCRIPTION OF THE DRAWING

Novel features and advantages of the present invention in addition to those mentioned above will become apparent to those skilled in the art from a reading of the following detailed description in conjunction with the accompanying drawings wherein.

DETAILED DESCRIPTION OF THE INVENTION

The present invention relates to a method of forming a film on the surface of an electrode plate by electrolytically polymerizing methacrylonitrile alone or a mixture of methacrylonitrile and a vinyl monomer in an appropriate solvent in the presence of a supporting electrolyte. Details of this method are as follows.

The following substances are appropriate as a vinyl monomer for copolymerization of methacrylonitrile according to this invention: acrylonitrile, methylmethacrylate, methylacrylate, acrylamide, methacrylamide, acrolein, methyl vinyl ketone, ethyl vinyl ether, glycidyl, acrylate, glycidyl methacrylate, vinyl acetate, allyl alcohol vinyl-toluene, 2 - hydroxyethylmethacrylate styrene, α-methylstyrene, butadiene. Appropriate compounds as a supporting electrolyte include McKee's salt, tetraalkylammonium salt, a nitrate or perchlorate of alkali metal. The solvent may be dimethylacetamide or dimethylformamide, and the following polar solvents may be used: dimethylsulfoxide, acetonitrile, pyridine, formamide, nitrobenzene.

Figure 2:
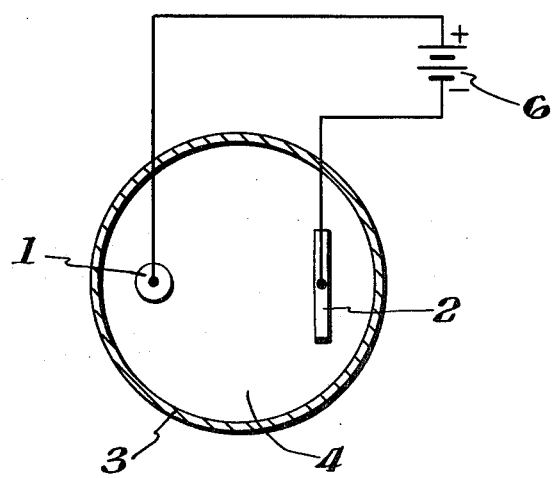
FIG. 2 is a cross section plan view of the apparatus of FIG. 1.
Figure 1:
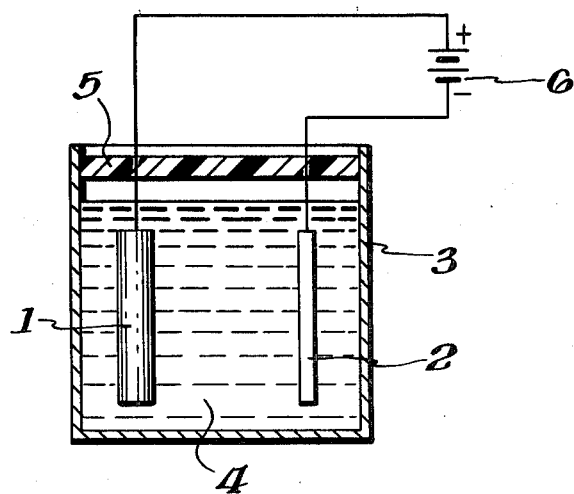
FIG. 1 is a schematic diagram showing the apparatus used according to the present invention.

Referring to the drawing, FIG. 1 is a schematic diagram illustrating the apparatus used according to the present invention, and FIG. 2 is a plan view of the apparatus. In the drawing, reference numerals 1 and 2 represent an electrode and an object to be coated, respectively. An electrolytic bath 3 contains a mixture 4 composed of methacrylonitrile and other substances, and the bath is covered by a lid 5. A direct current source 6 is provided as shown.

In the formation of a film, first a blend 4 of methacrylonitrile alone, or a monomer solution, i.e., methacrylonitrile combined with more than one kind of vinyl monomer mentioned above, and a solvent containing a small amount of a supporting electrolyte, is poured into the bath 3. The electrode 1 and the object to be coated 2 are placed in the bath, and direct current is passed through the mixture 4 with the electrode 1 and the object 2 as respective poles. A vinyl polymer film is formed on the surface of the object 2. It is advisable to carry out the electrolytic polymerization at room temperature bubbling with nitrogen but it may also be carried out in a temperature range above the freezing point but below the boiling point of the solvent. The appropriate density of the current would be less than 50 ma./cm.$^2$. The current-passing time should be varied depending on the types of monomer and solvent. The film may or may not be washed. After completion of polymerization, the dryng may be conducted above the boiling point of the solvent, but it may also be done at ordinary temperatures.

According to the present invention, a film with high molecular weight can be obtained using methacrylonitrile as the monomer instead of acrylonitrile. The film thus obtained excels in adhesion, hardness and flexibility over the film obtained by conventional methods. Moreover, the method according to the present invention permits the surface of an object with any complex shape to be coated with a uniform film. Also, the present invention has other merits such as the film thickness being easily adjustable through control of the electrolysis condition, the film obtained requiring no curing, and the coulomb efficiency being improved.

Several examples of the present invention are given below along with a reference example.

Example 1

| | G. |
|---|---|
| Methacrylonitrile | 30 |
| Dimethylformamide | 70 |
| Mckee's salt | 2 |

With a mixture of the above composition and a carbon rod as the anode and an aluminum plate as the cathode, direct current with a density of 4 ma./cm.$^2$ was passed for 10 minutes through the mixture at 25° C. bubbling with nitrogen and as a result a yellow film exceling in adhesion, hardness and flexibility was formed on the aluminum plate.

Example 2

| | G. |
|---|---|
| Methacrylonitrile | 50 |
| Dimethylacetamide | 50 |
| Mckee's salt | 2 |

With a mixture of the above composition and adopting the same conditions as in Example 1, direct current with a density of 5 ma./cm.$^2$ was passed for 3 minutes through the mixture, and as a result a yellow film with high molecular weight, superior adhesion, hardness and flexibility was formed on the aluminum plate.

Example 3

| | G. |
|---|---|
| Methacrylonitrile | 33 |
| Methylmethacrylate | 10 |
| Dimethylformamide | 57 |
| Mckee's salt | 2 |

With a mixture of the above composition and a carbon rod as the anode and an aluminum plate as the cathode, direct current with a density of 5 ma./cm.$^2$ was passed through the mixture for 5 minutes at 25° C. bubbling with nitrogen and as a result a light yellow film of copolymer with high hardness and good adhesion was formed on the aluminum plate.

Example 4

| | G. |
|---|---|
| Methacrylonitrile | 33 |
| Acrylonitrile | 5 |
| Dimethylacetamide | 62 |
| Mckee's salt | 2 |

With a mixture of the above composition, polymerization was conducted under the same conditions as in Example 2. This was followed by drying for 20 minutes at 100° C., and as a result a yellowish brown film of copolymer with superiority in hardness, adhesion and flexibility was formed.

Example 5

| | G. |
|---|---|
| Methacrylonitrile | 30 |
| Methylvinyl toluene | 7 |
| Dimethylacetamamide | 63 |
| Tetraethyl ammonium chloride | 0.5 |

With a mixture of the above composition, a carbon rod as the anode and an iron plate as the cathode, direct current with a density of 5 ma./cm.$^2$ was passed through the mixture for 3 minutes at 20° C. bubbling with nitrogen and as a result a film was formed on the iron plate cathode. After drying the film for 20 minutes at 100° C., a yellow brown film of copolymer was obtained.

Example 6

| | G. |
|---|---|
| Methacrylonitrile | 25 |
| Glycidyl methacrylate | 10 |
| Ethylacrylate | 5 |
| Dimethylacetamide | 60 |
| Mckee's salt | 0.5 |

With a mixture of the above composition and adopting the same conditions as in Example 5, polymerization was conducted, and as a result a film was formed on the iron plate cathode. The film was dried for 10 minutes at 100° C., and a light yellow film of copolymer with superiority in hardness, adhesion and flexibility was formed.

Example 7

| | G. |
|---|---|
| Methacrylonitrile | 40 |
| Vinyl acetate | 10 |
| Dimethylformamide | 50 |
| Mckee's salt | 0.5 |

With a mixture of the above composition and adopting the same conditions as in Example 5, polymerization was conducted which resulted in a film formation on the iron plate cathode. The film was washed with water and dried so that a yellow film of copolymer with superiority in adhesion and flexibility was obtained.

Example 8

| | G. |
|---|---|
| Methacrylonitrile | 35 |
| Methacryloamide | 15 |
| Dimethylformamide | 50 |
| Tetramethyl ammonium chloride | 0.5 |

With a mixture of the above composition and conducting polymerization under the same conditions as in Example 5, a film was formed on the iron plate cathode. The film was dried for 20 minutes at 100° C. so that a yellow film of copolymer with superiority in adhesion and hardness was obtained.

Reference

| | G. |
|---|---|
| Acrylonitrile | 20 |
| Acetonitrile | 80 |
| Mckee's salt | 2 |

With a mixture of the above composition and a carbon rod as the anode and an aluminum plate as the cathode, direct current with a density of 10 ma./cm.$^2$ was passed through the mixture for 3 minutes at 25° C. bubbling with nitrogen, and as a result a yellow polyacrylonitrile film was formed on the aluminum plate. The film, having a low molecular weight and lacking in adhesion, hardness and flexibility, was found unsuitable for practical purposes.

To verify the effect of the present invention, the films obtained in the above examples and reference were submitted to physical tests for hardness and flexibility with the results as tabulated below:

| Method | Hardness (pencil) | Bent to 2 mm. φ | Cross-hatching test (adhesive tape test) | Resistance to boiling water |
|---|---|---|---|---|
| Example: | | | | |
| 1 | H | Well | 100/100 | 10 hours. |
| 2 | H | do | 100/100 | Do. |
| 3 | 2H | do | 100/100 | 12 hours. |
| 4 | 2H | do | 100/100 | 8 hours. |
| 5 | H | do | 90/100 | 3 hours. |
| 6 | 3H | do | 100/100 | 10 hours. |
| 7 | H | do | 90/100 | 3 hours. |
| 8 | H | do | 100/100 | 8 hours. |
| Reference | HB | Poor | 0/100 | 45 minutes. |

NOTE.—The above test methods were mostly relied on JIS-K-5400.

What is claimed is:

1. A method of forming an electrolytically polymerized film on an object surface characterized by using a mixture composed of methacrylonitrile alone or methacrylonitrile added with a vinyl monomer, and a polar organic solvent added with a supporting electrolyte for improving electroconductivity, taking an object to be coated and positioning it as one of the electrodes, passing direct current through the mixture and thereby forming a polymer film of methacrylonitrile on the surface of the object.

2. A method of forming an electrolytically polymerized film as in claim 1 wherein the vinyl monomer for copolymerization of methacrylonitrile is selected from acrylonitrile, an ester or amide of acrylic acid or methacrylic acid, styrene, methylstyrene or butadiene.

3. A method of forming an electrolytically polymerized film as in claim 1 wherein the supporting electrolyte is selected from Mckee's salt, tetraalkylammonium salt, or a nitrate or perchlorate of alkali metal.

4. A method of forming an electrolytically polymerized film as in claim 1 wherein the solvent is a polar solvent selected from dimethylacetamide, dimethylformamide, dimethylsulfoxide, acetonitrile, pyridine, formamide, or nitrobenzene.

5. A method of forming an electrolytically polymerized film as in claim 1 wherein the electrolytic polymerization takes place bubbling with nitrogen.

6. A method of forming an electrolytically polymerized film as in claim 1 wherein the electrolytic polymerization is carried out at a current density of less than 50 ma./cm.$^2$.

References Cited
UNITED STATES PATENTS

| | | | |
|---|---|---|---|
| 3,335,075 | 8/1967 | Borman | 204—56 R |
| 3,501,432 | 3/1970 | Wright, et al. | 204—56 R |
| 3,546,016 | 12/1970 | Pavelich et al. | 204—56 R |
| 3,567,612 | 3/1971 | Tsuk | 204—181 |
| 3,590,016 | 6/1971 | Hopwood | 204—181 |

GERALD L. KAPLAN, Primary Examiner

T. TUFARIELLO, Assistant Examiner

U.S. Cl. X.R.

204—56 R, 181